(12) United States Patent
Corrigan et al.

(10) Patent No.: US 12,050,568 B2
(45) Date of Patent: Jul. 30, 2024

(54) SYSTEM AND METHOD FOR IMPLEMENTING A DATA QUALITY FRAMEWORK AND ENGINE

(71) Applicant: Genworth Holdings, Inc., Richmond, VA (US)

(72) Inventors: Christopher Corrigan, Chesterfield, VA (US); Atul Saurav, Glen Allen, VA (US)

(73) Assignee: Genworth Holdings, Inc., Richmond, VA (US)

( * ) Notice: Subject to any disclaimer, the term of this patent is extended or adjusted under 35 U.S.C. 154(b) by 41 days.

(21) Appl. No.: 17/941,266

(22) Filed: Sep. 9, 2022

(65) Prior Publication Data

US 2024/0086379 A1    Mar. 14, 2024

(51) Int. Cl.
*G06F 17/00* (2019.01)
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
CPC ........ G06F 16/13; G06F 16/24; G06F 16/156; G06N 3/00; G06N 5/00; G05B 13/00
USPC ....... 707/690, 722, 736, 758; 706/12, 14, 45
See application file for complete search history.

(56) References Cited

U.S. PATENT DOCUMENTS

| | | | | |
|---|---|---|---|---|
| 9,065,827 | B1* | 6/2015 | Taylor | H04L 67/535 |
| 9,813,450 | B1* | 11/2017 | Wasiq | H04L 63/20 |
| 10,547,434 | B2* | 1/2020 | Tsuda | H04L 1/0026 |
| 10,834,358 | B1* | 11/2020 | Harrison | H04N 5/2628 |
| 10,838,946 | B1 | 11/2020 | Todd et al. | |
| 2002/0099737 | A1* | 7/2002 | Porter | G06F 16/951 |
| | | | | 715/255 |
| 2005/0273691 | A1* | 12/2005 | Cox | G06F 16/93 |
| | | | | 707/999.001 |
| 2006/0285556 | A1* | 12/2006 | Schneck | H04L 67/60 |
| | | | | 370/490 |
| 2008/0159074 | A1* | 7/2008 | Guis | G01V 1/364 |
| | | | | 367/40 |
| 2009/0198700 | A1* | 8/2009 | Ross | G06F 16/68 |

(Continued)

OTHER PUBLICATIONS

International Searching Authority, PCT International Search Report and Written Opinion, International Application No. PCT/US2023/032138, Dec. 20, 2023, pp. 1-9.

(Continued)

*Primary Examiner* — Hung D Le

(74) *Attorney, Agent, or Firm* — Hunton Andrews Kurth LLP

(57) ABSTRACT

An embodiment of the present invention is directed to a Metadata-Driven Data Quality Framework and Engine that enables dynamic generation of code for assessing data quality based on qualified metadata content. The Data Quality Framework may be directed to an enterprise scaled application that embodies Data Quality disciplines for good/optimal Data Governance. An embodiment of the present invention may be integrated into a Metadata Management process of an overall Data Governance Program so the data user's meaning and understanding may become part of the automated data quality process.

20 Claims, 14 Drawing Sheets

(56) References Cited

U.S. PATENT DOCUMENTS

| | | | |
|---|---|---|---|
| 2009/0210381 A1* | 8/2009 | Singh | G06F 16/338 |
| | | | 707/999.102 |
| 2014/0288940 A1* | 9/2014 | Grant | G10L 19/167 |
| | | | 704/500 |
| 2015/0277976 A1* | 10/2015 | De | G06F 9/4843 |
| | | | 718/101 |
| 2018/0091773 A1* | 3/2018 | Moussa | G06T 1/20 |
| 2018/0107694 A1* | 4/2018 | Dupey | G06F 16/2365 |
| 2019/0130526 A1* | 5/2019 | Zhou | H04N 5/2628 |
| 2019/0155797 A1* | 5/2019 | Nath | G06F 16/48 |
| 2019/0251072 A1 | 8/2019 | Pyle | |
| 2020/0380379 A1 | 12/2020 | Tatti et al. | |
| 2021/0042679 A1* | 2/2021 | Kidd | G06F 16/22 |
| 2021/0065094 A1* | 3/2021 | Mathiesen | G06Q 10/06398 |
| 2021/0075843 A1* | 3/2021 | Feldmann | H04N 21/8456 |
| 2021/0150287 A1* | 5/2021 | Baek | G06V 10/70 |
| 2021/0326334 A1* | 10/2021 | Shrivastava | G06F 16/2379 |
| 2022/0019566 A1* | 1/2022 | Heller | G06Q 10/067 |
| 2022/0197741 A1 | 6/2022 | Pitchumani et al. | |
| 2022/0200948 A1* | 6/2022 | Gundavelli | H04W 24/04 |
| 2022/0295377 A1* | 9/2022 | Zhu | H04W 40/26 |
| 2023/0005501 A1* | 1/2023 | Wyman | G06F 3/0653 |
| 2023/0359598 A1* | 11/2023 | Binjola | G06F 16/152 |

OTHER PUBLICATIONS

Micic et al., "Towards a Data Quality Framework for Hetergeneous Data", IEEE International Conference on Internet of Things (iThings) and IEEE Green Computing and Communications (GreenCom) and IEEE Cyber, Physical and Social Computing (CPSCom) and IEE Smart Data (SmartData), Conference date—Jun. 21-23, 2017, https://ieeexplore.ieee.org/stamp/stamp.jsp?tp=&arnumber=8276745, pp. 1-8.

\* cited by examiner

| | |
|---|---|
| Rule Name 410: | A meaningful business title. |
| Rule Description 412: | A description of what is being assessed and how. Additional context regarding magnitude of impact to financial calculations or processes. |
| Rule Type 414: | Accuracy, Completeness, Timeliness, Consistency, & Conformity |
| Rule Technical Description 416: | A description of what is to be tested. This can include SQL statements or specific criteria at the attribute level. |
| Rule Technical Specification 418: | Database/File Server Name    Schema/File Name    Attribute/Column Name |
| | This may be populated with json for complex tests or an actual list of valid values for that test. |

Status 420    Frequency 422    Thresholds 424

[Active ▽]    [ ▽]    Amber [% Passed]

Criticality 426    Daily, weekly, monthly, quarterly, semi-annual, yearly    Red [% Passed]

| Physical Attribute 910 | | | | Data Quality Rule 920 | | | |
|---|---|---|---|---|---|---|---|
| Database | Schema | Table | Element | Name | Business Description | Type | Result |
| | | | | | | | % |
| | | | | | | | % |
| | | | | | | | % |
| | | | | | | | % |
| | | | | | | | % |
| | | | | | | | % |
| | | | | | | | % |
| | | | | | | | % |

SYSTEM AND METHOD FOR IMPLEMENTING A DATA QUALITY FRAMEWORK AND ENGINE

FIELD OF THE INVENTION

The invention relates generally to a system and method for implementing a data quality framework and more specifically to a data quality framework that is metadata-driven.

BACKGROUND OF THE INVENTION

Using inaccurate or wrong data, no matter how innovative the tools or techniques used for analytics and reporting, results in inaccurate or wrong answers. In addition, using any data, whether good or bad, in undocumented or unsustainable processes is costly and risky.

There is an industry need to fully assess the fitness of the data in a timely and efficient manner. Traditionally, this requires a formal process of requirements gathering, design, development, testing activities, and an adequately size window of time to perform the assessments. This process is then followed by building of some sort of presentation for the results. Current techniques are costly to build and sustain this formal process. Moreover, extensive time and resources are required to execute the data quality assessments.

These and other drawbacks exist.

SUMMARY OF THE INVENTION

According to an embodiment, the invention relates to a system that implements a metadata-driven data quality framework. The system comprises: an input interface that receives a request for a data quality rule and one or more characteristics of data quality; and a data quality engine comprising a computer processor coupled to the input interface and further configured to perform the steps of: based on the one or more characteristics, generating one or more data quality requirements; responsive to the request, collecting technical metadata that relates to technical specification, frequency of execution and one or more thresholds; processing the technical metadata to automatically generate code for the data quality rule; based on the frequency, identifying a predetermined schedule for execution of the data quality rule; automatically executing the code for the data quality rule pursuant to the predetermined schedule; storing, via a data storage, results of the data quality rule; and presenting, via a user interface, the technical metadata to a data user.

According to another embodiment, the invention relates to a method that implements a metadata-driven data quality framework. The method comprises the steps of: receiving, via an input interface, a request for a data quality rule and one or more characteristics of data quality; based on the one or more characteristics, generating one or more data quality requirements; responsive to the request, collecting technical metadata that relates to technical specification, frequency of execution and one or more thresholds; processing the technical metadata to automatically generate code for the data quality rule; based on the frequency, identifying a predetermined schedule for execution of the data quality rule; automatically executing the code for the data quality rule pursuant to the predetermined schedule; storing, via a data storage, results of the data quality rule; and presenting, via a user interface, the technical metadata to a data user.

The system and method may utilize a specially programmed computer system comprising one or more computer processors, interactive interfaces, electronic storage devices, and networks.

An embodiment of the present invention recognizes a challenge of data quality is not whether some smart data user can test the quality of the data before they use it. The challenge is whether this can be accomplished in such a way as to communicate what was tested, how it was tested, and its current results in an efficient manner. An embodiment of the present invention realizes various benefits including savings in resources and time as well as efficiencies in data quality tests, controls and assessments. As more and more data quality rules are created and centrally published with results, the need for additional data quality rules by other data users simply diminishes. The innovative Data Quality Framework is directed to improving Information Technology (IT) resources engaged in building out data quality rules, deploying them and then presenting them.

The Data Quality Framework is directed to maintaining and enhancing the value of the data quality rules as well as realizing efficiencies in time and resources to build/deploy data quality rules, present results, the overall sustainment costs, and/or the amount of time to process the relevant data quality rules.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 4 illustrates an exemplary data quality specification, according to an embodiment of the present invention.

FIG. 9 illustrates an exemplary interface, according to an embodiment of the present invention.

DETAILED DESCRIPTION OF THE PREFERRED EMBODIMENT(S)

Figure 1:
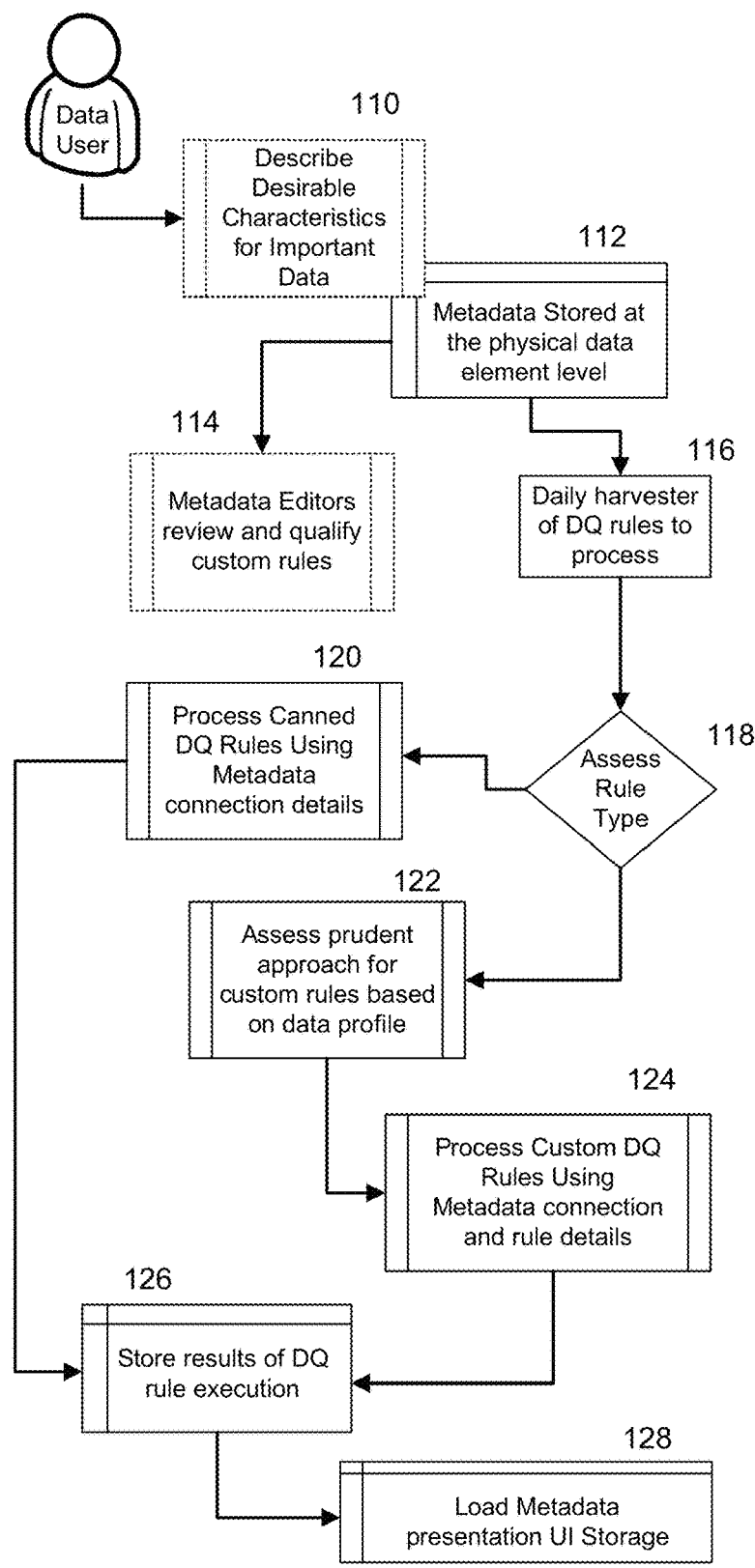
FIG. 1 is an exemplary flowchart of an overall architecture, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

A challenge in the industry is when bad data is used in a process that is then relied upon by decision makers within a company. Data quality, which may be considered part of data governance, addresses where the data came from, the quality of the data, the quality of the data after the data transformation, etc. Current efforts and resources to manage and maintain data quality within an expected timeframe can be overwhelming and unsustainable.

An embodiment of the present invention is directed to a Metadata-Driven Data Quality Framework and Engine (which may be referred to as "DQ Framework"). The DQ Framework enables dynamic generation of code for assessing data quality based on qualified metadata content.

An entity (e.g., company) seeking to leverage its data to drive business decisions and strategy will want to ensure that the data being leveraged is appropriate, accurate, and complete. This may be accomplished by identifying a set of desirable characteristics for the data and then comparing the values of the data against the set of characteristics. Generally, data quality may be defined by the presence of a preponderance of desirable characteristics or absence of undesirable characteristics. Characteristics may relate to completeness (e.g., sparsity or missing values); accuracy (e.g., reflects what was intended); timeliness (e.g., realistic and align dates); consistency (e.g., values align within and across systems); and conformity (e.g., system attributes and formats align). Various techniques may be supported including canned assessments (e.g., standard rules run on important data including nulls, value ranges, reasonableness); data profiling (e.g., overall content compared historically); and custom rules (e.g., additional rules testing conformity and consistency). Results may be presented in various formats including comparison of thresholds to determine failure, publicly available information, requirement that initiates issue resolution as well as other actions, warnings, and information.

This process of comparing data to its desirable characteristics may be referred to as the data governance discipline of assessing data quality. A goal of data quality may relate to determining accuracy and completeness of the data and then communicating those findings to a broader data user community.

Data Governance may refer to a multi-disciplinary function within a broader data management function that seeks to ensure the transparency and consistency of the data required by critical business activities. For example, Data Governance may represent a formal discipline that manages the data from an asset perspective much like a Facility Manager managing a facility.

A challenge that an embodiment of the present invention seeks to address relates to delivering on data quality effectively and efficiently such that the total cost of ownership of the assessments do not negate the value of programmatically assessing the data's quality.

FIG. 1 is an exemplary flowchart of an overall architecture, according to an embodiment of the present invention. At step 110, a data user may describe one or more desirable characteristics for important data. The characteristics may also be automatically obtained through a data source or system.

At step 112, metadata may be stored at a physical data element level. According to an embodiment of the present invention, metadata refers to conveying knowledge, understanding, and accountability for data. For example, Address Line One Text is linked to the business term for Addressee Name, which may be defined as the customer to whom the correspondence is to be delivered. According to another example, data quality rule metadata may include the following: Business Name: Addressee Customer Validity; Business Description: All addressees must be validly present within our master domain of customers; Technical Description: Select address_line_1 txt from master_customer_data where golden_flg='Y'; Frequency: Daily; Priority Critical; Yellow Threshold: 99.99%; Red Threshold: 99.8%. Data are known facts or things used as a basis for inferencing or reckoning. Therefore, metadata is an expression of the essential meaning of the data through descriptive and contextual annotation from the business data consumers point-of-view. Contextual context may include projects affecting the data, processes that leverage the data, the understanding Information Technology (IT) or other technology team had when building the physical object (e.g., tradition data dictionary), or the expectations and meaning of the data's quality. Data dictionary may represent a repository of understanding from a technical perspective and its purpose is to document what the solution builder understands what it is they are building. Therefore, the terminology and standards are much looser than that of metadata and may be meaningful to IT but not so complete from a business perspective.

At step 114, metadata editors may review and qualify custom rules. The process of developing custom data quality rules may involve assessing data's health according to some other characteristics or comparisons within the data itself. While there can be any number of custom rules for any given data element, the types of tests may fall into one of the following categories: Consistency (e.g., distribution check, negative check override, date history override, date future override); Accuracy (e.g., business validation, valid value check); Completeness (e.g., null override, process validation); and Conformity (e.g., number of rows check, distinct number of rows check, minimum value count check, maximum value count check, minimum value check, maximum value check, summation check). Other types of tests may be applied based on various other applications, scenarios, industries, etc.

At step 116, daily harvester of DQ rules may collect technical metadata that relate to technical specification, frequency of execution and thresholds. For example, daily harvester may represent a process that repeats on a 24 hour clock (or other predetermined cycle) to collect existing and new content from the data quality metadata and present the content to a data quality engine. At step 118, rule type may be assessed. Rule types may include canned rules, custom rules, complex rules, etc. For example, rule types may be leveraged to categorize the harvested data quality rules to determine an optimal (or most prudent) method for processing the code based on complexity of the rule and a simple assessment of the data's profile for volume.

Step 120 may process canned DQ rules using metadata connection details. Using the above example from step 112, within the metadata may also exist a data catalog. The data catalog may represent a collection of physical details for each piece of data stored. Critical details may include: Database Name, Schema Name, Table Name, Column Name, and Column Type. The DQ Framework may leverage this information to determine a technical connection required to the data in order to process the data quality rule. For example, Customer_MDM; Customer_Ord; Customer; Customer Name.

Canned rules may represent highly structured assessments where the only difference is what data element to process against. These rules are by the type of data elements (e.g., character, numeric, or date) and the logic will not change. Canned rules may refer to numeric data (e.g., mean check, median check, mode check, range check, negative check); date (e.g., too old check, too new check, validity check); string (e.g., junk character check); regardless of data type (e.g., null count, data pattern count, observed data type, average length, unique row count), etc.

Figure 10:
FIG. 10 illustrates an exemplary interface, according to an embodiment of the present invention.
Figure 11:
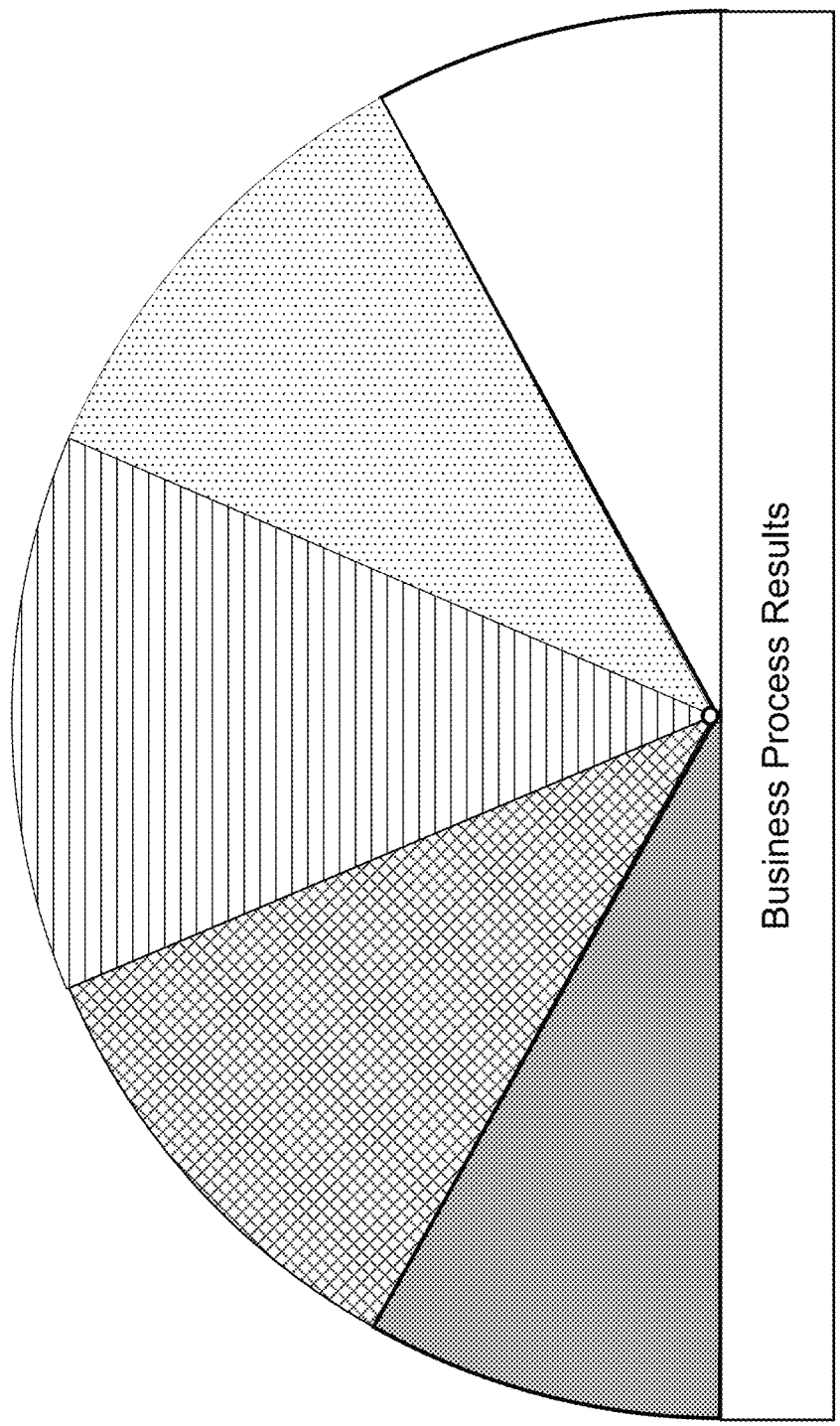
FIG. 11 illustrates an exemplary interface, according to an embodiment of the present invention.

Step 122 may assess a prudent approach for custom rules based on data profile. An embodiment of the present invention recognizes that there are numerous ways to approach the execution of a data quality rule script. Some approaches may be considered better than others based on type and volume of data. Step 122 may leverage the type of data (e.g., text, number, dates, binary large objects, etc.) along with an expected number of rows based on historical trends or initial volume to determine whether a multi-threaded or single threaded approach is appropriate. Step 124 may process custom DQ rules using metadata connection and rule details. Step 126 may store results of DQ rule execution. Step 128 may then load metadata presentation to UI storage. FIGS. 9, 10, and 11 below represent illustrations of how data quality results may be presented, with a focus on the integration and connection of data quality rules to their results within a business context. While the process of FIG. 1 illustrates certain steps performed in a particular order, it should be understood that the embodiments of the present invention may be practiced by adding one or more steps to the processes, omitting steps within the processes and/or altering the order in which one or more steps are performed.

As the global economy becomes more and more dependent upon data, a company's success may be directly tied to the quality of the data that they use. While this solution provides very valuable insights into the quality of the data, an embodiment of the present invention may be extended to support an organization's desire to use data to drive decisions, revenue and other business objectives and goals.

An embodiment of the present invention is directed to assessing whether data is fit for a particular purpose. For some applications, this goes beyond an individual data element's quality. The Data Quality Framework may capture the very definition of "fit for purpose" within the metadata, which means the integration of lineage (e.g., data pipeline), reconciliation of the data throughout the pipeline, the statistical variations of the data over time, and an alignment assessment of the data to the intended purpose may be included within the output analysis.

According to an embodiment of the present invention, the Data Quality Framework may leverage metadata, data profiles, individual data quality results, and the data pipeline with a standardized, complex analyses to arrive at the fitness of the data used in a process or analytic project, automatically through this simple metadata.

Generally, data quality tools focus on the Information Technology solution to build, deploy code, schedule processes, and execute data quality rules. These results are then made available for the manual determination of fitness, which often excludes the many other components that determine true fitness. According to an embodiment of the present invention, the Data Quality Framework focuses on the metadata to drive that activity so the business can spend more time using the data than waiting for quality results and manual fitness assessments.

According to an embodiment of the present invention, the Data Quality Framework may be directed to an enterprise scaled application that embodies Data Quality disciplines for good and/or optimal Data Governance. An embodiment of the present invention may be integrated into a Metadata Management process of an overall Data Governance Program so the data user's meaning and understanding may become part of the automated data quality process. Other implementations and infrastructures may be supported.

According to an embodiment of the present invention, the Data Quality Framework enables greater reuse of data user knowledge and understanding while shortening the overall implementation of data quality assessments on an enterprise scale. Additionally, through the transparency into the metadata rules, the Data Quality Framework increases the productivity of involved users/participants and significantly reduces the costs and/or resources to build and sustain the data quality rules.

An embodiment of the present invention seeks to simplify and expedite time to market for data quality rules and further facilitates data quality management. An embodiment of the present invention is directed to a Data Quality Framework that processes and translates metadata into a programming language that business users can access and interact with. For example, business users may provide inputs in natural language and other defined formats. The Data Quality Framework dynamically builds the code based on the metadata. The code may then be executed based on a schedule that defines when and how often the code should be run.

An embodiment of the present invention may receive criteria for good data quality through an interface of a Data Quality Framework. This may be in various formats such as good/bad characteristics. The Data Quality Framework may then generate data quality requirements and corresponding metadata. The metadata may include the information concerning the data that the Framework will run the rules against. The Framework provides an ability to connect and access the metadata, wherever it may be stored, and may further plug into any metadata source/engine. The Data Quality Framework receives, processes and/or translates the metadata (using JSON, for example) to then automatically generate and execute corresponding code. Using the metadata enables the Framework to verify specifics, provide more transparency and control over data quality.

The Data Quality Framework may be platform agnostic and support various implementations including cloud services. An embodiment of the present invention may be used to drive business focus and attention. For example, the Framework may identify alert conditions based on exceeded thresholds. These conditions may direct business users where to focus to improve data quality and avoid use of risky or bad data. An embodiment of the present invention may rely on various sources of data, including data repositories, flat files, XML files, database tables, reports, etc.

An embodiment of the present invention may overlay quality of data on business process steps. If a data quality analysis was performed on data used in a process step, an embodiment of the present invention may overlay or associate quality of data with that process step. This information may then be extended to other steps for improved data quality and awareness. Data quality overlay may apply to nodes in a graph database where data quality may be associated with a node that processed the underlying data. Other process steps and applications may be supported.

Figure 2:
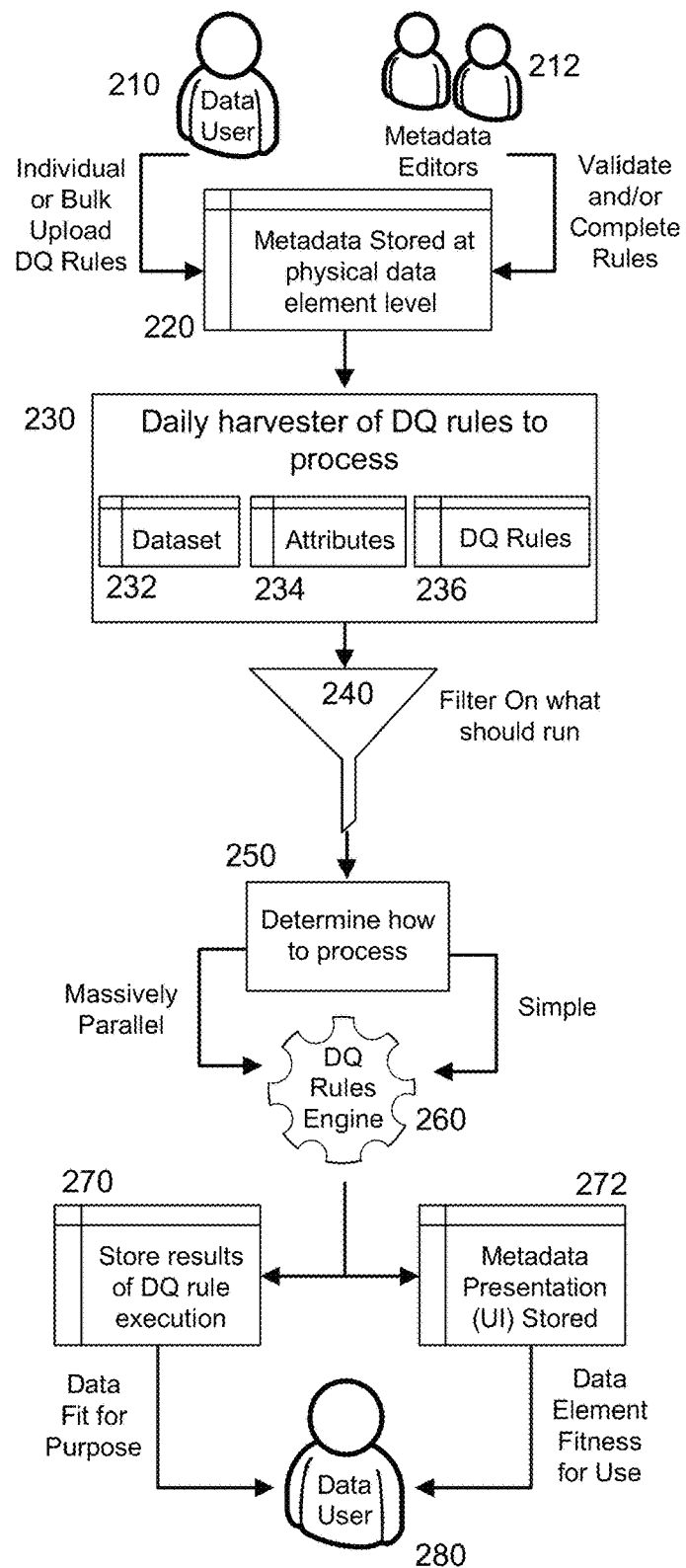
FIG. 2 is an exemplary flowchart of an overall process, according to an embodiment of the present invention.

FIG. 2 is an exemplary flowchart of an overall process, according to an embodiment of the present invention. According to an embodiment of the present invention, the Data Quality Framework may represent a combination of reduced manual intervention and leveraging of centrally and stored documentation regarding the meaning and understanding of the data (e.g., metadata).

As shown in FIG. 2, Data User 210 may perform individual or bulk uploads of data quality (DQ) rules. At this step, a user may submit a request for a new DQ rule and also identify characteristics associated with data quality assessment.

Metadata Editors 212 may validate and/or complete rules. Using the Data Quality Framework, Metadata Editors 212 may determine an appropriate rule for a new DQ rule request. Rules may include simple rules, canned rules as well as complex rules of varying degree. An embodiment of the present invention may then convert the rule into code (e.g., JSON) which may then be saved.

Metadata may be stored at a physical data element level at 220. Daily harvester of DQ rules may be processed at 230. Harvesting may refer to collecting technical metadata including Dataset 232, Attributes 234 and DQ Rules 236. In this example, DQ Rules 236 represent existing rule metadata. At a predetermined schedule (e.g., every morning), the Framework may execute rules which may include recognizing a new rule that will be executed according to a schedule and/or frequency (e.g., daily, weekly, monthly, condition-based, etc.).

Filters may be applied at 240. For example, relevant filters or routers may include data volume to be read for processing, date of last data quality rule execution, complexity of the rules to process, etc. A determination of how to process the filtered data may be applied at 250. This may include determining between massively parallel or simple processing. Other processing techniques may be applied. DQ Rules Engine 260 may be invoked. Results of DQ rule execution may be stored as shown by 270. Metadata presentation (via a user interface (UI)) may be stored as shown by 272. Data (e.g., data fit for purpose; data element fitness for use, etc.) may be communicated to Data User 280. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
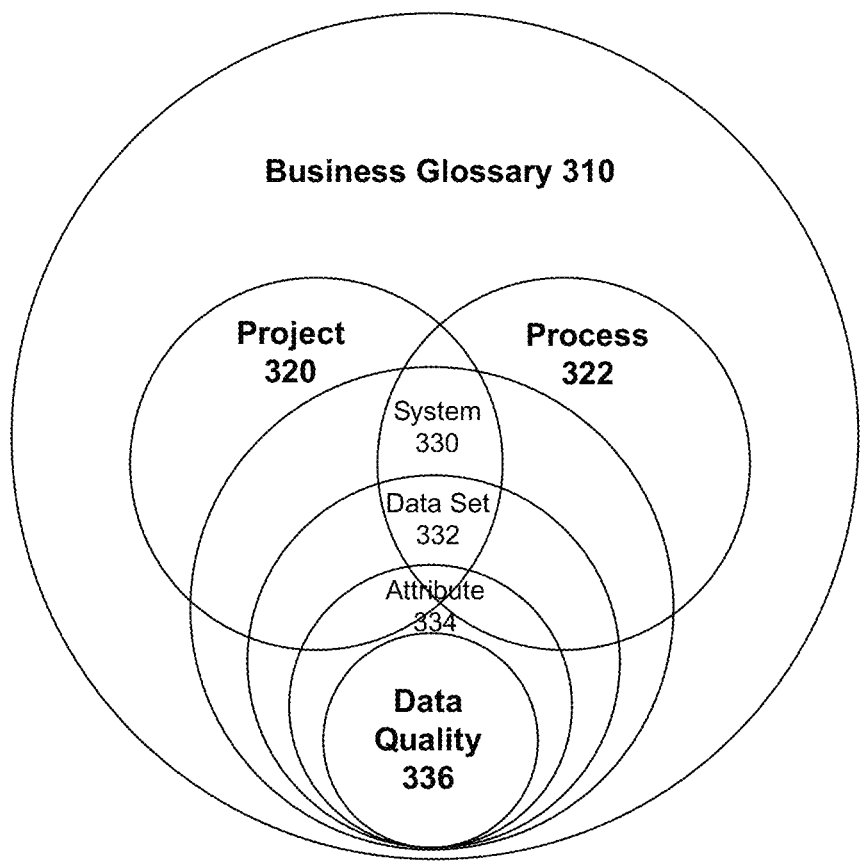
FIG. 3 illustrates metadata types and relationships, according to an embodiment of the present invention.

FIG. 3 illustrates metadata types and relationships, according to an embodiment of the present invention. Metadata types may include: Business Glossary 310; Project 320; Process 322; System 330; Data Set 332; Attribute 334; and Data Quality 336. Other types and relationships may be realized.

Business Glossary 310 provides a business context for data and a relationship of that context to its physical incarnation within a database, report, or flat file. This business context may provide a common lexicon for all to leverage when referring to the data to reduce the risk of using the wrong data.

An embodiment of the present invention recognizes that the meaning of the data, e.g., the metadata, cannot be understood without input from a knowledgeable data user. The Data Quality Framework may require that the business and technical meaning of the data be stored centrally for internal enterprise usage. This may be referred to as Metadata application. Examples may include data governance platform, data integration platforms, data catalog tools, etc.

An embodiment of the present invention may receive actual metadata (e.g., mainly technical content such as table, column names, schema, etc.) as well as additional inputs such as process controls, roles, and responsible parties. Data quality rules may be applied to an actual technical content. In addition, an embodiment of the present invention may provide a declaration of what data attributes are important to the business.

A data quality requirement may include capturing data quality (DQ) rules. In some examples, this may include a manual capturing of DQ rules. If captured properly, these requirements may be reused for similar important data attributes in an efficient and streamlined manner.

An embodiment of the present invention may receive the technical metadata and those attributes deemed important, existing data quality rules (e.g., canned, complex, etc.). In some examples, a data user may communicate what it is they need assessed for quality and how they would like to go about that assessment.

An embodiment of the present invention may be directed to completing the data quality requirement with a title of the DQ rule, a business description of what is being tested, how often, and other technical content the data user may have to describe any calculations or tests.

FIG. 4 illustrates an exemplary data quality specification, according to an embodiment of the present invention. When necessary, a data quality specification may be required to articulate the business specification into the appropriate language of the DQ Framework (.json) for execution.

A data quality specification may include the actual objectives of the data quality assessment and any other content provided to describe the rule. In addition, an embodiment of the present invention may generate the code for the rule tested and converted into the appropriate language.

FIG. 4 illustrates the metadata content associated with a data quality rule. As shown in FIG. 4, content may include: Rule Name 410, Rule Description 412, Rule Type 414, Rule Technical Description 416, and Rule Technical Specification 418. Other details may include Status 420, Frequency 422, Thresholds 424 and Criticality 426.

Rule Name 410 may include a meaningful business title.

Rule Description 412 may include a description of what is being assessed and potentially how. Additional context regarding the magnitude of the impact of financial calculations or processes may be included.

Rule Type 414 may include accuracy, completeness, timeliness, consistency and conformity. Other rule types may be available to support other applications, scenarios, etc.

Rule Technical Description 416 may include a description of what is to be tested. This may include SQL statements and specific criteria at the attribute level, for example. Rule Technical Specification 418 may reference physical assets, including Database/File Server name, schema/file name, attribute/column name, for example. This may include j son (or other file format) for complex tests, actual list of valid values, etc. Other details may include Status 420 (e.g., active, inactive, etc.), Frequency 422 (e.g., daily, weekly, monthly, quarterly, semi-annual, yearly, etc.), Thresholds 424 (e.g., percentage passed) and Criticality 426 (e.g., high, medium, low).

Figure 5:
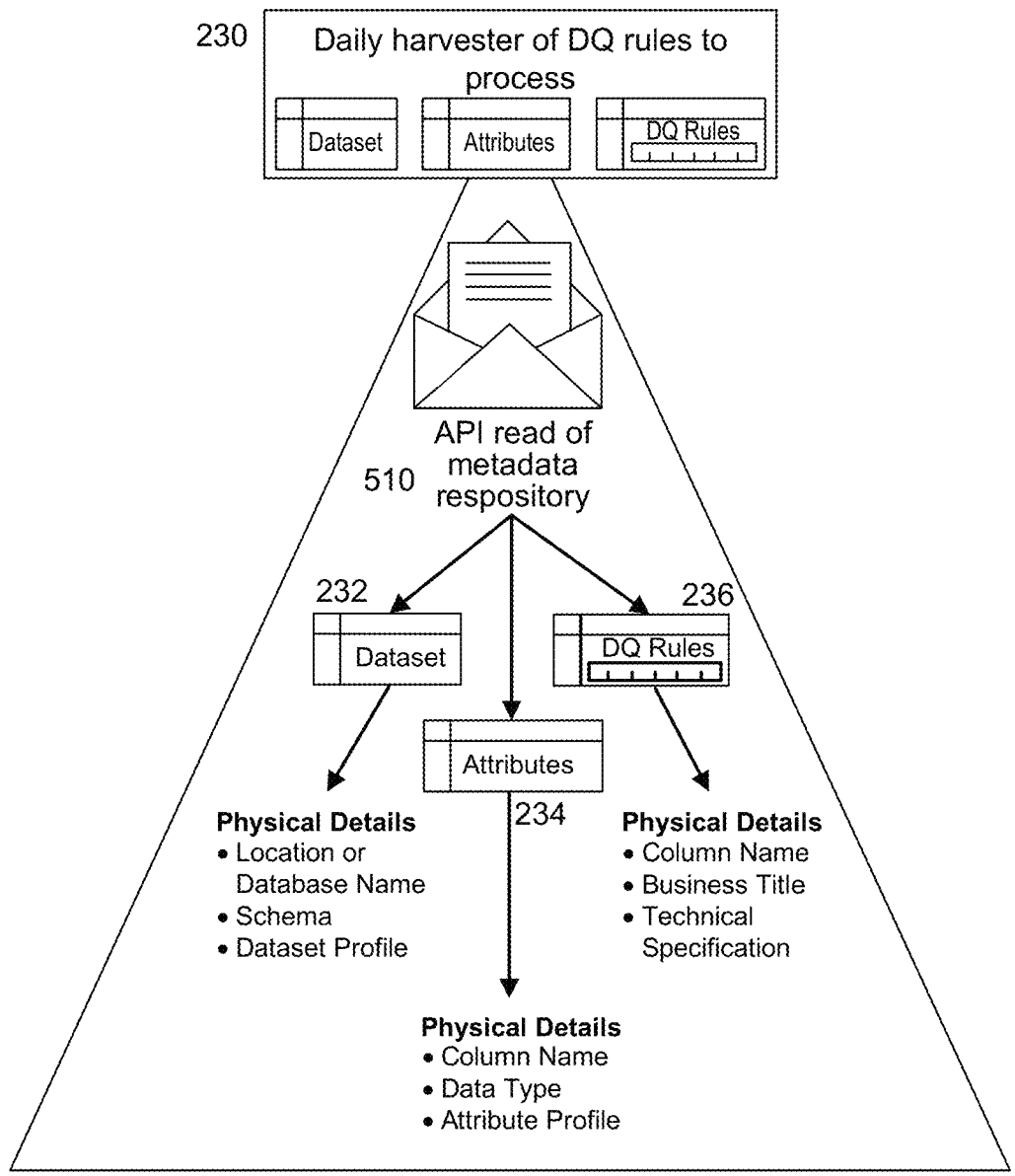
FIG. 5 illustrates harvesting content, according to an embodiment of the present invention.

FIG. 5 illustrates harvesting content, according to an embodiment of the present invention. More specifically, FIG. 5 illustrates an exemplary process of collecting technical metadata for data quality rules external to its main central storage repository for the purpose of building an execution plan and then running the rules against the target data. As shown in FIG. 5, 510 may represent an API read of metadata repository. Dataset 232 may include physical details such as location, database name, schema, dataset profile, etc. Attributes 234 may include column name, data type, attribute profile, etc. DQ Rules 236 may include column name, business title, technical specification, etc.

Daily harvester of DQ rules to process 230 may receive technical metadata to include the technical specification, frequency of execution, and Amber/Red thresholds and then generate the rules that are run on a given day or other time period/condition.

Figure 6:
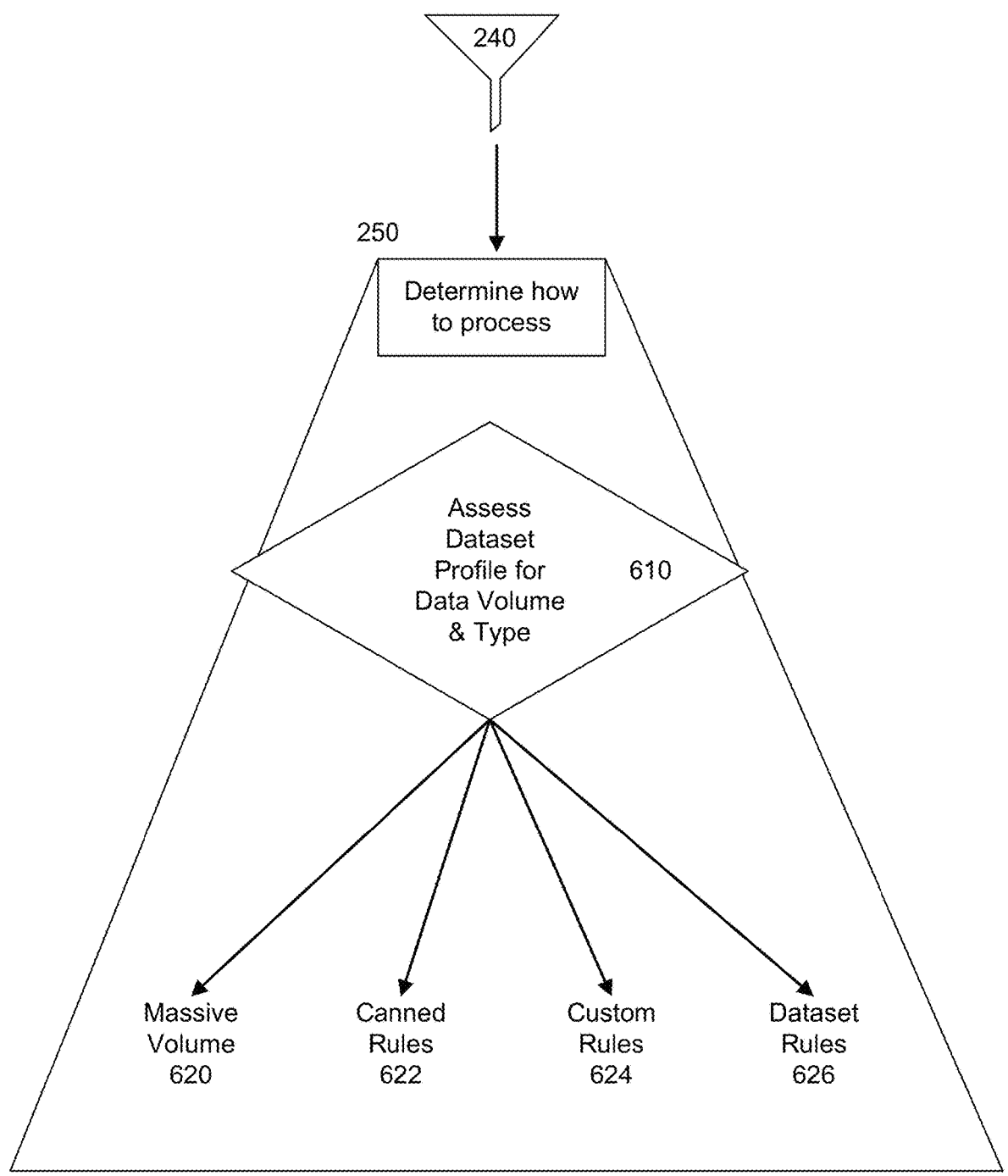
FIG. 6 illustrates filtered options, according to an embodiment of the present invention.

FIG. 6 illustrates filtered options, according to an embodiment of the present invention. FIG. 6 illustrates a process of determining which DQ Framework process flow to utilized for processing. Data is filtered at 240. The system then determines how to process the filtered data at 250. As shown by 610, dataset profile may be assessed for data volume, type and/or other characteristics.

An embodiment of the present invention may receive the DQ rules to execute and the profile of the data being tested, e.g., data volume, other critical profiling metrics, etc. and then generate the execution plan for the data quality rules and the initiation of the actual process of assessing the quality of the data.

The various rules may include Massive Volume 620, Canned Rules 622, Custom Rules 624 and Dataset Rules 626. Other rules may be generated and/or identified to support other applications, scenarios, etc.

Figure 7:
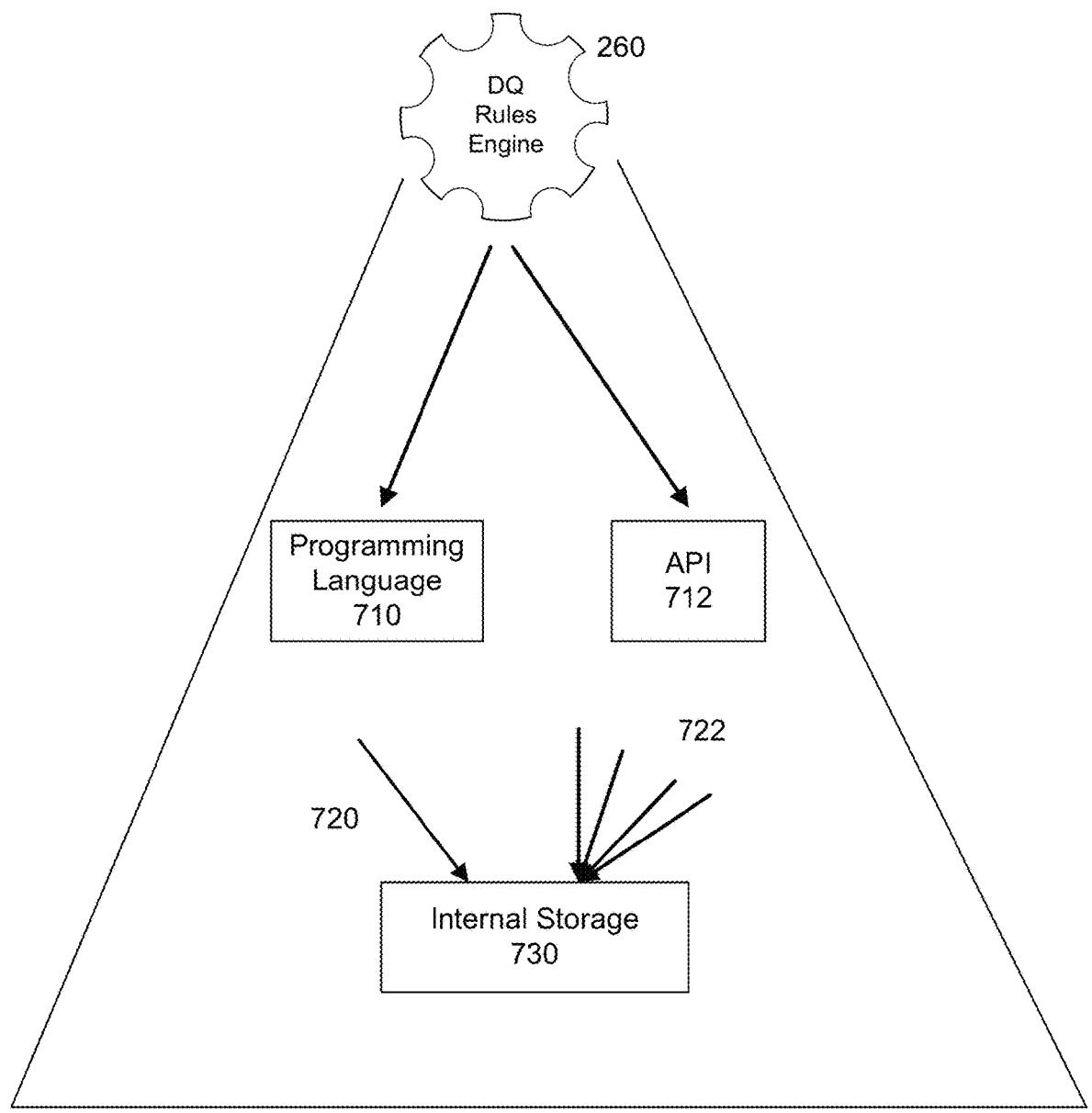
FIG. 7 illustrates execution pathing, according to an embodiment of the present invention.

FIG. 7 illustrates execution pathing, according to an embodiment of the present invention. An embodiment of the present invention may be directed to capturing outcomes of data quality assessments to facilitate analytics and provide more robust data quality assessments.

Programming Language 710 represents a computer programming language, such as Python.

API 712 represents an interface for a distributed computing framework and a set of libraries for real-time, large scale data processing and other applications in the computer programming language.

720 and 722 represent various executions performed on the internal storage data, represented by 730.

An embodiment of the present invention may receive the actual results of the DQ assessments and then generate the results by data quality rule that are time stamped to assess trends and/or compare statistical variations.

Figure 8:
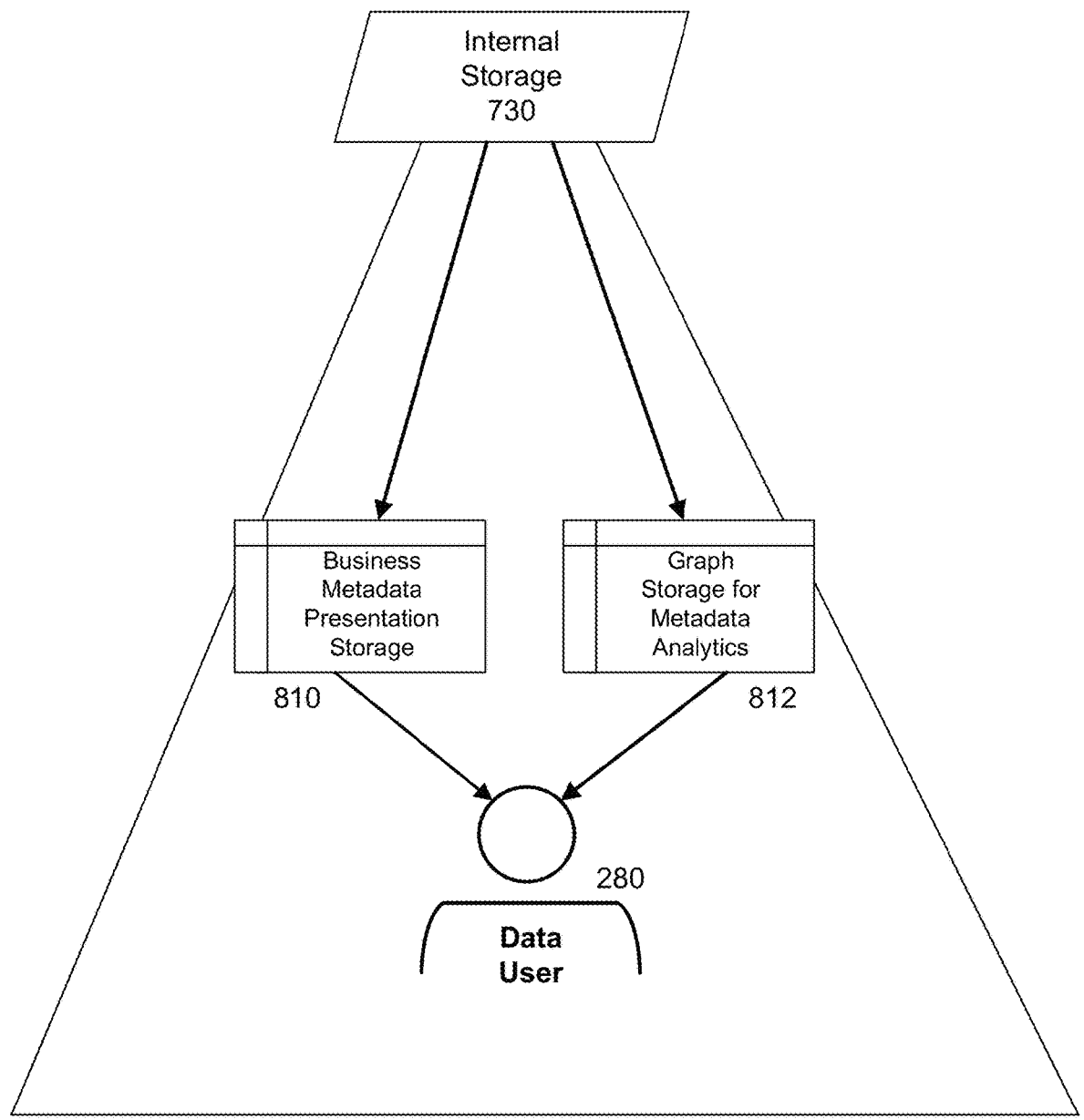
FIG. 8 illustrates an exemplary results presentation, according to an embodiment of the present invention.

FIG. 8 illustrates an exemplary results presentation, according to an embodiment of the present invention. An embodiment of the present invention is directed to presenting the current results of the assessments through a user interface or other communication medium. This may be supported in various implementations, including as a standalone report in Power BI, SAP Business Objects, etc. The results may also be presented by integrating the recently executed rule results within the data quality metadata.

An embodiment of the present invention may receive an internal storage of the DQ Framework results and then generate integrated DQ results with the Metadata Application, a dashboard of the results, etc. By integrating data quality results, an embodiment of the present invention is directed to representing the results in various ways.

FIG. 9 illustrates an exemplary interface, according to an embodiment of the present invention. FIG. 9 presents individual rule results. This may include Physical Attributes 910 including Database, Schema, Table and Element. Data Quality Rule 920 may include Name, Business Description, Type and Result. Result may be represented as a percentage.

FIG. 10 illustrates an exemplary interface, according to an embodiment of the present invention. FIG. 10 illustrates data quality rule categories 1010. In this example, FIG. 10 represents row counts by thresholds 1020 for various categories, including Accuracy, Completeness, Conformity, Consistency and Timeliness. The categories illustrated are merely exemplary and other categories may be supported. The different portions may represent different threshold severity levels.

Quality data may be defined as being fit for use, meaning that it has features and characteristics that are in alignment with what the business data user expects or understands. The idea of data quality as a discipline resolves around understanding the meaning of the data and knowing what is expected. There are several dimensions of data quality that may be deployed to determine a sufficient presence of those characteristics that yield an understanding of the data's fitness. These may include accuracy, completeness, conformity, consistency, and timeliness.

Accuracy represents a dimension of data quality that assesses if the data measures to the "real-world" or model expectations for the values available matching what is expected. This may include: incorrect spellings of product or person names, addresses, and even untimely or not current data can impact operational and analytical applications. Default profiling rules testing this dimension of DQ may include the custom business rules and valid value rules.

Completeness represents a dimension of data quality that assesses if the data is missing, or in an unusable state. In some cases, missing data is irrelevant, but when the information that is missing is critical to a specific business process, completeness becomes an issue. Default profiling rules testing this dimension of DQ may include the null and null override rules.

Conformity represents a dimension of data quality that assesses if the data values conform to specified formats. If so, do all the values conform to those formats? Maintaining conformance to specific formats is important in data representation, presentation, aggregate reporting, search, and establishing key relationships. Default profiling rules testing this dimension of DQ may include the string pattern and string length rules. Conformity may also refer to reconciling data from one repository to another.

Consistency represents a dimension of data quality that assess if distinct data instances provided conflict with information about the same underlying data elsewhere. Are values consistent across data sets? Do interdependent attributes always appropriately reflect their expected consistency? Inconsistency between data values plagues organizations attempting to reconcile between different systems and applications. Default profiling rules testing this dimension of DQ may include the number range and string junk rules.

Timeliness represents a dimension of data quality that assess whether the data represents the reality at the specified point in time. Is the data too far into the past or future? Default profiling rules testing this dimension of DQ may include the date history and future rules.

FIG. 11 illustrates an exemplary interface, according to an embodiment of the present invention. FIG. 11 represents business process results where related results may be aggregated. As shown in FIG. 11, attribute level results may be aggregated into a single score based on the metadata for that business process. This aggregate value may then be mapped to its corresponding value on a scale, e.g., scale of 1 to 5. This gauge is illustrative only and is meant to be a simple illustration of the viability of the data leveraged in the defined business process. The darker shaded sections (on the left) may indicate a riskier situation where the data is unreliable. The lighter sections (on the right) may represent high data quality and reliability. The shaded sections in between may represent varying risk and quality of data. Other graphics and illustrations in varying detail and granularity may be provided via a user interface.

By leveraging a Business Metadata Application, an embodiment of the present invention realizes various benefits and advantages. Benefits of metadata-driven data quality may include: less time articulating requirements; code reusability; metadata content reusability; does not require a separate initiative to report results or ensure all that can or should know have access to the report; through the centralizing content anyone who might be interested in the data is granted a line of sight into something they may not know about the data; extremely fast turn-around as these data quality check requirements are simple documentation with no coding; and highly efficient processing enables an alignment of data quality assessments to the underlying data's volatility.

According to an embodiment of the present invention, the Data Quality Framework may integrate into existing business metadata management. For example, the DQ Framework enables data users to describe their data quality check once and see the results come out with potentially the shortest time to market for any rule depending upon its complexity. While the DQ Framework integrates with any REST API enabled business metadata application for the presentation of results, an embodiment of the present invention provides the ability to view and leverage those results while searching the data catalog for the right data to leverage.

An embodiment of the present invention may leverage various technologies and deployments including opensource technologies. For example, the Data Quality Framework may be a feature within a broader data governance product, such as a MetaGraph product. The MetaGraph product provides the ability to navigate the data lakes and seas. MetaGraph represents a system within which the Data Quality Framework may operate. MetaGraph provides all of the detail regarding the meaning and understanding of the data so that the business may obtain the maximum value from its data. MetaGraph has three primary modules, including Metadata Hub, MetaLake, and MetaMotivate. Metadata Hub may represent an interface to access the meaning and fitness of data. MetaLake may represent a single source/repository for finding the truth about the meaning and fitness of data. MetaMotivate may represent an integrated engine that generates new metadata content.

The Data Quality Framework may represent a component of MetaMotivate, which provides for the energy necessary to power the MetaGraph precision instrument through processes, machine learning and analytics on the metadata. MetaLake delivers a robust repository of meaning and understanding content regarding the data structured according to support business needs. Metadata Hub enables any data user to leverage the collected and derived content to find the data needed to deliver trusted, quality results on time. Other implementations may be supported.

For example, the MetaGraph may perform machine learning on top of metadata to drive the creation of metadata and fulfillment of quality and other qualities of governance. MetaGraph seeks to facilitate the ability of making data discoverable and then applying machine learning and other processing to determine which data to use in terms of data quality (e.g., use this data instead of that data).

Figure 12:
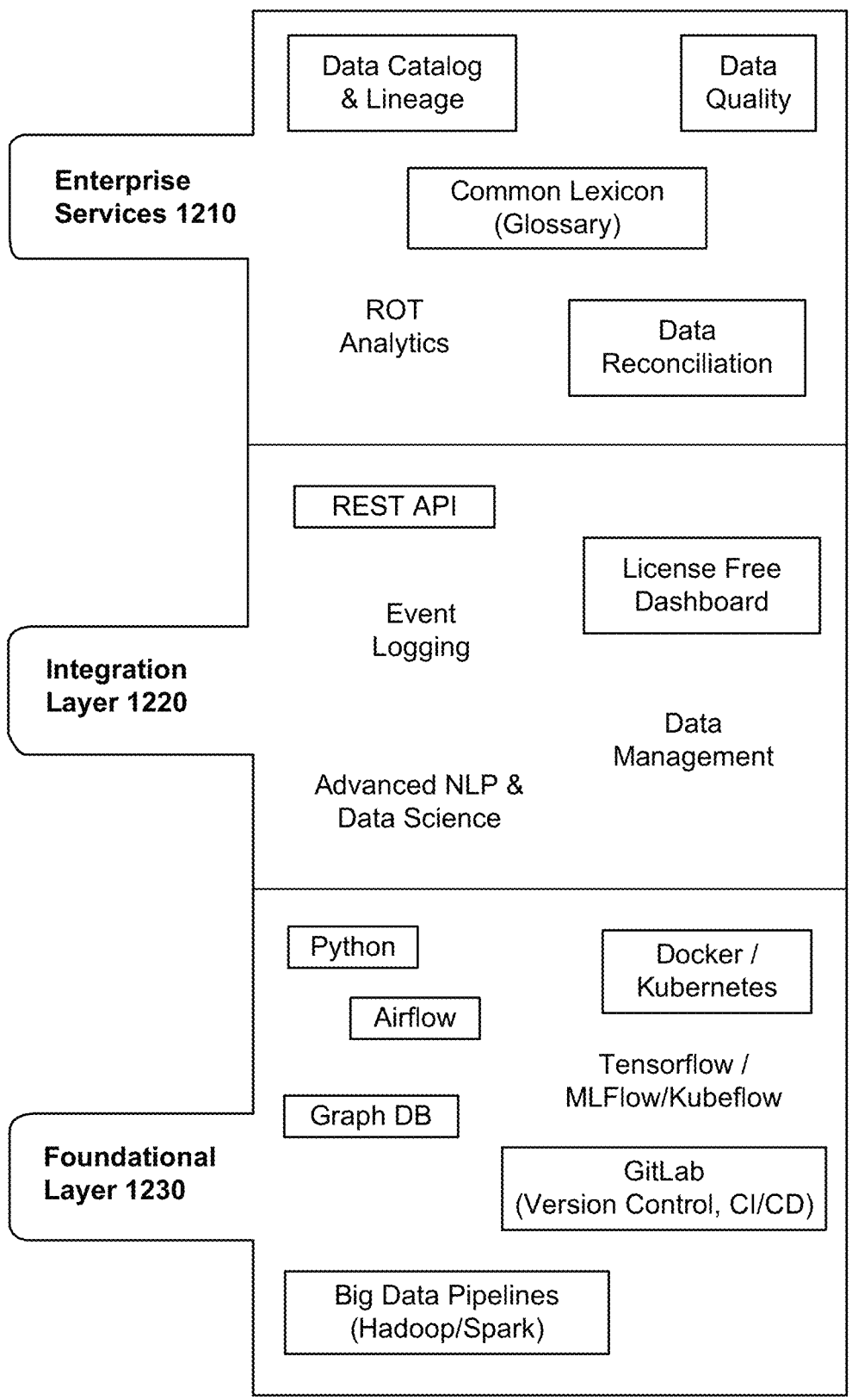
FIG. 12 is an exemplary data governance technology stack, according to an embodiment of the present invention.

FIG. 12 is an exemplary data governance technology stack, according to an embodiment of the present invention.

FIG. 12 illustrates the open-source nature of the solution and the minimalist approach to the overall footprint and costs for the solution. FIG. 12 illustrates Enterprises Services 1210, Integration Layer 1220 and Foundational Layer 1230.

An embodiment of the present invention may support various deployments. The system may be fully cloud ready as well as deployable on premises at a company's data center.

If deploying on-premises, there may be a need for a Kubernetes cluster sized appropriately for the volume of data for the data catalog. In addition, connectivity to various data repositories where quality rules will be processed may be set up independently.

While the Data Quality Framework is a component of a broader Data Governance product offering, it may remain a standalone application and as such has its distinctive roadmap.

According to an embodiment of the present invention, the DQ Framework may be represented as an autonomous product that includes a standalone metadata repository for technical content and specifications. Additionally, this product may read the metadata platform, extract which data elements that will have quality assessments executed, and on what schedule.

An exemplary process may deal directly with canned rules, valid value rules, and customer rules. According to an exemplary illustration, a process optimizer may be implemented to determining which approach to follow.

An embodiment of the present invention may include a presentation of the results according to its metadata.

An exemplary illustration may use data governance tool and a business metadata repository, as such REST APIs exist to get data from and into the repository.

An embodiment of the present invention may be directed to enabling a broader enterprise scaled scheduling of various processes according to the profile of the data to be assessed. A Predictive Schedule Optimizer may leverage simplistic profiles of the data (e.g., row counts) to assess if a multi-threaded approach is warranted.

An embodiment of the present invention recognizes that there are numerous data quality assessments that are best left at the dataset level. These are statistical deviations from prior runs which may be realized to offer a broader but more detailed reconciliation over time, as well as a reconciliation between sources and targets of a data pipeline.

An assignment Group may be applied to determine to whom an issue should be sent based on the data's lineage from where it was assessed.

Lineage may refer to a type of metadata that describes how data moves from one location to another location. Here, location refers to a data repository, flat file, report, or query. Lineage may represent a depiction of the pipeline created to deliver the data to the ultimate data consumer. For example, lineage may identify data that has been transformed a number of times.

Given that the metadata indicates at what percentage of failing records determines an issue, Issue Management Integration may be applied to extract the metadata for the rule (e.g., title, description, technical description and specification, results, etc.) and prepare it for a given issue management tool.

Figure 13:
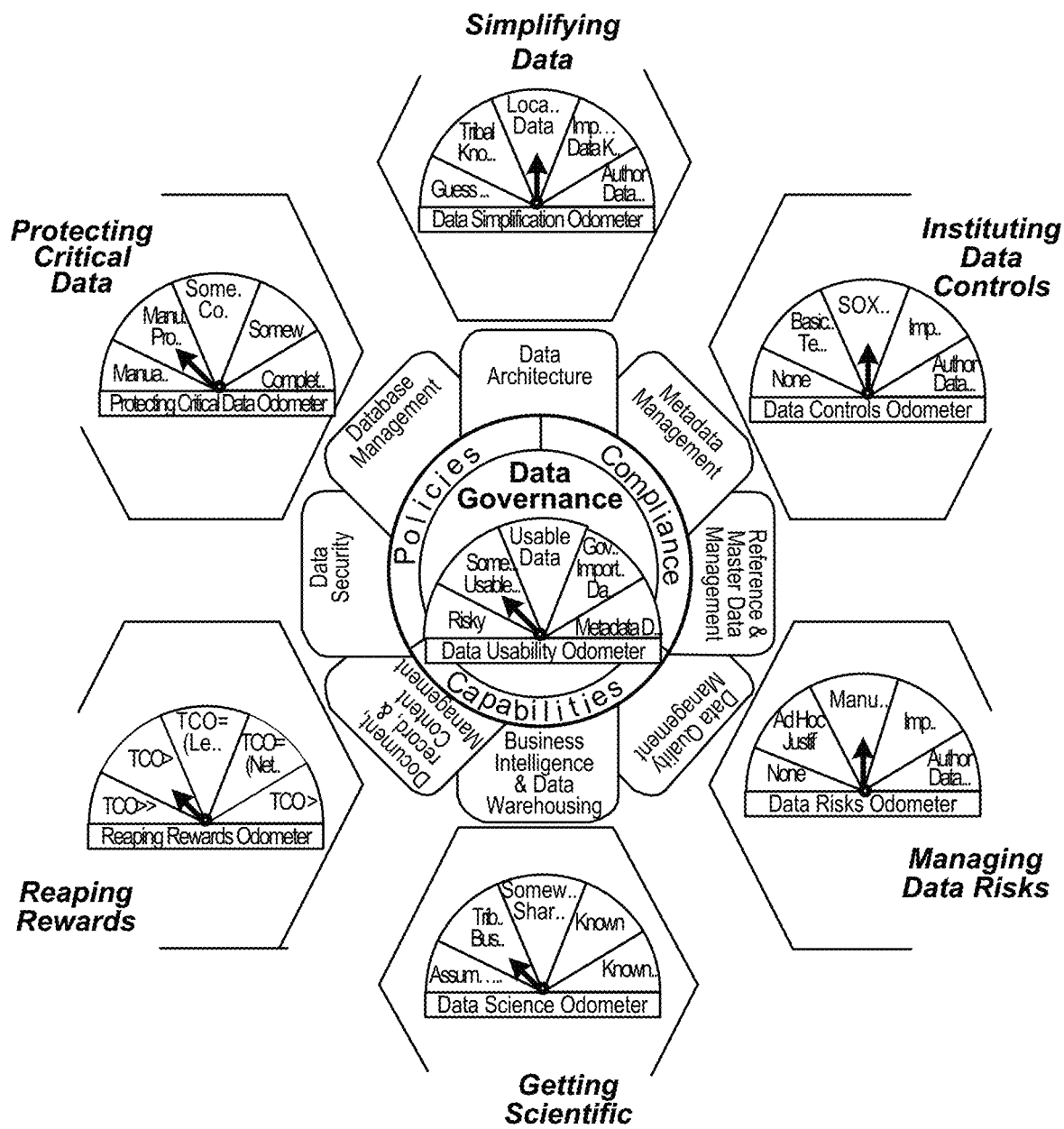
FIG. 13 is an exemplary illustration of Metadata-driven data governance, according to an embodiment of the present invention.

FIG. 13 is an exemplary illustration of Metadata-driven data governance, according to an embodiment of the present invention.

MetaGraph enables efficient and effective data governance that yields meaningful results that are intuitive and immediately applicable to the prevailing business needs for action, direction and decisions. While understanding data's quality, meaning, lineage and accountability, provides value in and of itself, Metadata Hub (e.g., an interface to access the meaning and fitness of data) enables any data user to leverage the collected and derived content to navigate and find the data needed to deliver quality results on time. The precision necessary to drive business decisions dictates that there is sufficient content across all facets of business meaning. The MetaLake (e.g., a single source/repository for finding the truth about the meaning and fitness of data) delivers a robust lake of meaning and understanding regarding the data to support business needs. The MetaMotivate (e.g., an integrated engine that generates new metadata content) provides the energy necessary to power the MetaGraph precision instrument through processes, machine learning and analytics on the metadata.

MetaGraph leverages user provided metadata, machine learned metadata and accompanying data analytics to assess the business' understanding of the data and thereby certify the results. As shown in FIG. 13, Data Governance may include Policies, Compliance and Capabilities. Features and functions may include: data architecture; metadata management; reference and master data management; data quality management; business intelligence and data warehousing; document, record and content management; data security and database management. Results may be realized through simplifying data; instituting data controls; managing data risks; getting scientific; reaping rewards; and protecting critical data. The results may be communicated through various interfaces and graphics, such as odometers illustrated in FIG. 13. A Data Usability Odometer provides a graphic that illustrates the overall usability of the data. For example, data may be categorized as risky, somewhat useable, usable data, governed important data, metadata-driven data utilization. A similar graphic may be applied for each of the results. Other graphics and scales may be implemented.

Figure 14:
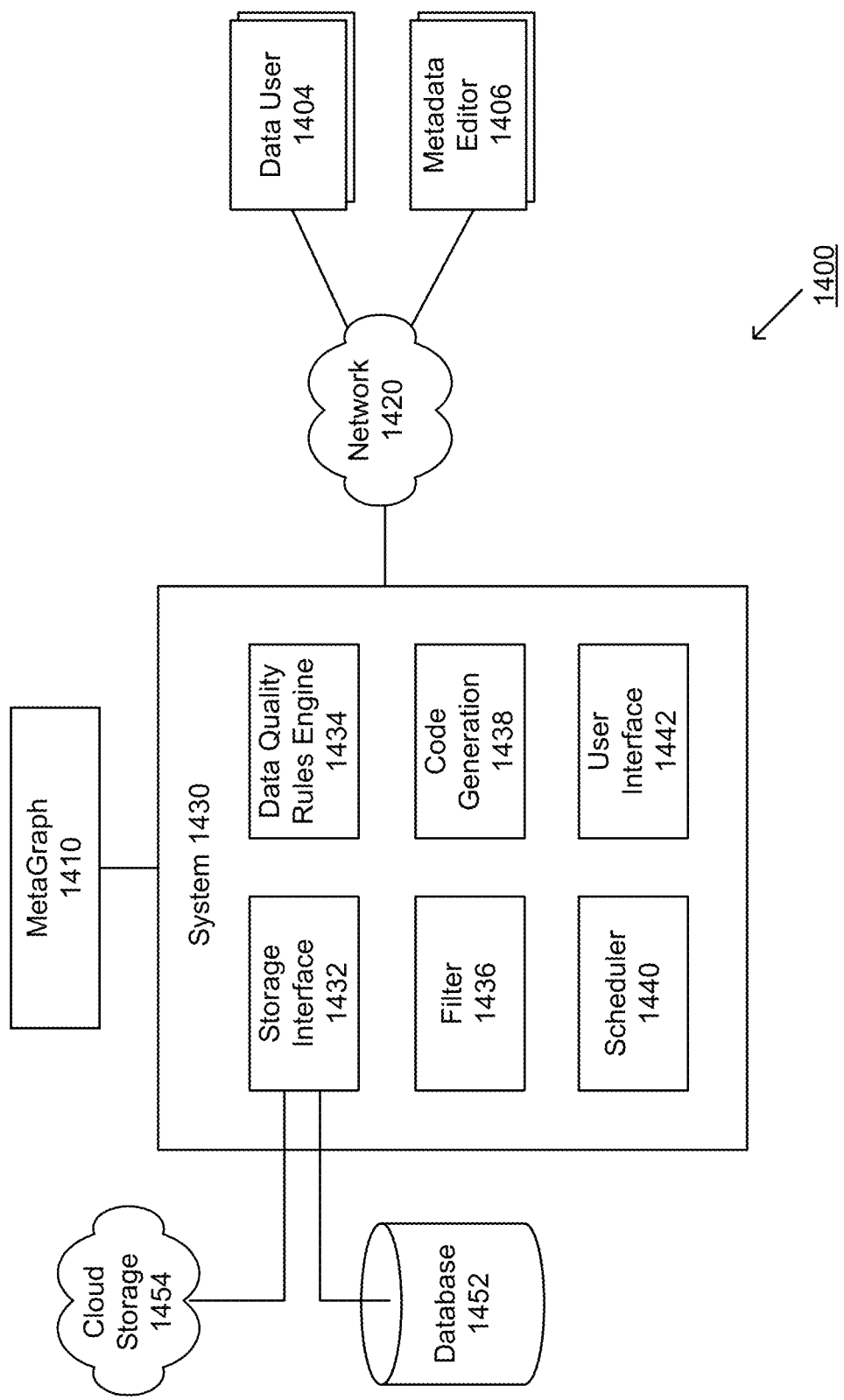
FIG. 14 is an exemplary system diagram, according to an embodiment of the present invention.

FIG. 14 is an exemplary system diagram, according to an embodiment of the present invention. FIG. 14 illustrates System 1430 that executes Data Quality Rules Engine 1434. System 1430 may manage data quality and rules generation for various entities and may be part of a larger data governance system, such as MetaGraph 1410. System 1430 may interact with MetaGraph 1410 as an integrated system/component or as a third-party service entity. Other implementations and relationships may be realized.

System 1430 may support various functions and modules including Storage Interface 1432, Data Quality Rules Engine 1434, Filter 1436, Code Generation 1438, Scheduler 1440 and User Interface 1442.

Storage Interface 1432 may interface with one or more storage components, such as Database 1452, Cloud Storage 1454, etc. Storage Interface 1432 may manage various forms of data including rules, metadata, code, etc.

Data Quality Rules Engine 1434 may generate various types of rules to determine data quality. Rules may include canned rules, custom rules, complex rules, etc.

Filter 1436 may apply various filters to refine the data.

Code Generation 1438 enables dynamic generation of code for assessing data quality based on qualified metadata content.

Scheduler 1440 may execute rules based on frequency, a predetermined schedule, conditions and/or other criteria.

User Interface 1442 may enable users and/or other entities to interact with Data Quality Rules Engine 1434. User Interface 1442 may include browser or other user interactive interface. User interaction may be supported through various user devices, including computers, laptops, mobile devices, smartphones, tablets, etc.

According to an embodiment of the present invention, the Data Quality Rules engine may leverage metadata to generate a programmed data quality rule. As discussed above, the data quality rules may be simple (e.g., column a cannot be null for the most recent row of data) as well as progressively more complex (e.g., data entered for this column must be between 50 and 100 for the most current data available or the data in field "A" must be a value of "25" when filed "B" is True and Field "C" from another table is "Y").

Users may interact with System 1430 via Network 1420. User may include Data Users 1404, Metadata Editors 1406 as well as other participants Database 1452 and Cloud Storage 1454 may store and manage data relating to data quality, including rules, metadata, etc. Various forms of data may be stored and managed.

The system 1400 of FIG. 14 may be implemented in a variety of ways. Architecture within system 1400 may be implemented as hardware components (e.g., module) within one or more network elements. It should also be appreciated that architecture within system 1400 may be implemented in computer executable software (e.g., on a tangible, non-transitory computer-readable medium) located within one or more network elements. Module functionality of architecture within system 1400 may be located on a single device or distributed across a plurality of devices including one or more centralized servers and one or more mobile units or end user devices. The architecture depicted in system 1400 is meant to be exemplary and non-limiting. For example, while connections and relationships between the elements of system 1400 are depicted, it should be appreciated that other connections and relationships are possible. The system 1400 described below may be used to implement the various methods herein, by way of example. Various elements of the system 1400 may be referenced in explaining the exemplary methods described herein.

Network 1420 may be a wireless network, a wired network or any combination of wireless network and wired network. Network 1420 may further include one, or any number of the exemplary types of networks operating as a stand-alone network or in cooperation with each other. Network 1420 may utilize one or more protocols of one or more network elements to which it is communicatively coupled. Network 1420 may translate to or from other protocols to one or more protocols of network devices. Although Network 1420 is depicted as one network for simplicity, it should be appreciated that according to one or more embodiments, Network 1420 may comprise a plurality of interconnected networks, such as, for example, a service provider network, the Internet, a cellular network, corporate networks, or even home networks, or any of the types of networks mentioned above.

Data may be transmitted and received via Network 1420 utilizing a standard networking protocol or a standard telecommunications protocol.

While FIG. 14 illustrates individual devices or components, it should be appreciated that there may be several of such devices to carry out the various exemplary embodiments. Users may communicate with various entities using any mobile or computing device, such as a laptop computer, a personal digital assistant, a smartphone, a smartwatch, smart glasses, other wearables or other computing devices capable of sending or receiving network signals. Interface 1442 may represent a user interface and/or other interactive communication portal.

System 1430 may be communicatively coupled to Database 1452 and may include any suitable data structure to maintain the information and allow access and retrieval of the information. For example, Database 1452 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Database 1452 may be any suitable storage device or devices. The storage may be local, remote, or a combination thereof with respect to Database 1452. Database 1452 may have back-up capability built-in. Communications with Database 1452 may be over a network, or communications may involve a direct connection between Database 1452 and System 1430, as depicted in FIG. 14.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein.

The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a metadata-driven data quality framework, the system comprising:
   an input interface that receives a request for a data quality rule and one or more characteristics of data quality;
   a metadata repository configured to store metadata at a physical element level;
   a data quality engine comprising a computer processor coupled to the input interface and further configured to perform the steps of:
      based on the one or more characteristics, generating one or more data quality requirements;
      responsive to the request, performing an application programming interface (API) read of the metadata repository comprising:
         collecting data quality rules metadata comprising tec technical specification, frequency of execution and one or more thresholds;
         collecting dataset metadata comprising at least one of a location, a database name, a database schema, and a database profile; and
         collecting attributes metadata types comprising at least one of a column name, a database type, and an attribute profile;
      processing the quality rules metadata, dataset metadata, and attributes metadata to automatically generate code for the data quality rule, the processing comprising:
         assessing the data quality rule for a rule type; and
         determining a data processing scheme based on a complexity of the data quality rule, the assessed rule type, and an assessment of a data volume profile, wherein the scheme is one of multi-threaded processing and single threaded processing;
      based on the frequency, identifying a predetermined schedule for execution of the data quality rule;
      automatically executing the code for the data quality rule pursuant to the predetermined schedule;
      storing, via a data storage, results of the data quality rule; and
      presenting, via a user interface, the technical metadata to a data user.

2. The system of claim 1, wherein the one or more characteristics comprise: completeness, timeliness, consistency and conformity.

3. The system of claim 1, wherein collecting technical metadata further comprises accessing a metadata repository that includes datasets, attributes and existing data quality rules.

4. The system of claim 3, wherein the dataset comprises physical details including location, database name, schema and profile.

5. The system of claim 3, wherein the attributes refer to column name, data type and attribute profile.

6. The system of claim 3, wherein the existing data quality rules comprise column name, business title and technical specification.

7. The system of claim 1, wherein the data quality rule is a canned rule.

8. The system of claim 1, wherein the data quality rule is a custom rule, wherein the custom rule is processed using metadata and rule details.

9. The system of claim 1, wherein the predetermined schedule relates to frequency on a daily, weekly, monthly, quarterly, semi-annually or yearly schedule.

10. The system of claim 1, wherein the data user provides feedback in response to the technical metadata.

11. A method that implements a metadata-driven data quality framework, the method comprising the steps of:
   receiving, via an input interface, a request for a data quality rule and one or more characteristics of data quality;
   based on the one or more characteristics, generating one or more data quality requirements;
   responsive to the request, performing an application programming interface (API) read of a metadata repository comprising:
      collecting data quality rules metadata comprising technical specification, frequency of execution and one or more thresholds;
      collecting dataset metadata comprising at least one of a location, a database name, a database schema, and a database profile; and
      collecting attributes metadata types comprising at least one of a column name, a database type, and an attribute profile;
   processing the quality rules metadata, dataset metadata, and attributes metadata to automatically generate code for the data quality rule, the processing comprising:
      assessing the data quality rule for a rule type; and
      determining a data processing scheme based on a complexity of the data quality rule, the assessed rule type, and an assessment of a data volume profile, wherein the scheme is one of multi-threaded processing and single threaded processing;
   based on the frequency, identifying a predetermined schedule for execution of the data quality rule;
   automatically executing the code for the data quality rule pursuant to the predetermined schedule;
   storing, via a data storage, results of the data quality rule; and
   presenting, via a user interface, the technical metadata to a data user.

12. The method of claim 11, wherein the one or more characteristics comprise: completeness, timeliness, consistency and conformity.

13. The method of claim 11, wherein collecting technical metadata further comprises accessing a metadata repository that includes datasets, attributes and existing data quality rules.

14. The method of claim 13, wherein the dataset comprises physical details including location, database name, schema and profile.

15. The method of claim 13, wherein the attributes refer to column name, data type and attribute profile.

16. The method of claim 13, wherein the existing data quality rules comprise column name, business title and technical specification.

17. The method of claim 11, wherein the data quality rule is a canned rule.

18. The method of claim 11, wherein the data quality rule is a custom rule, wherein the custom rule is processed using metadata and rule details.

19. The method of claim 11, wherein the predetermined schedule relates to frequency on a daily, weekly, monthly, quarterly, semi-annually or yearly schedule.

20. The method of claim 11, wherein the data user provides feedback in response to the technical metadata.

* * * * *

UNITED STATES PATENT AND TRADEMARK OFFICE
CERTIFICATE OF CORRECTION

| | |
|---|---|
| PATENT NO. | : 12,050,568 B2 |
| APPLICATION NO. | : 17/941266 |
| DATED | : July 30, 2024 |
| INVENTOR(S) | : Christopher Corrigan and Atul Saurav |

Page 1 of 1

It is certified that error appears in the above-identified patent and that said Letters Patent is hereby corrected as shown below:

In the Claims

In Claim 1, Column 17, Line 23, "collecting data quality rules metadata comprising tec" should read --collecting data quality rules metadata comprising--.

Signed and Sealed this
Third Day of September, 2024

Katherine Kelly Vidal
*Director of the United States Patent and Trademark Office*